Feb. 16, 1943.　　　L. W. FOSTER　　　2,311,376
PROTECTIVE CIRCUIT
Filed Sept. 11, 1941
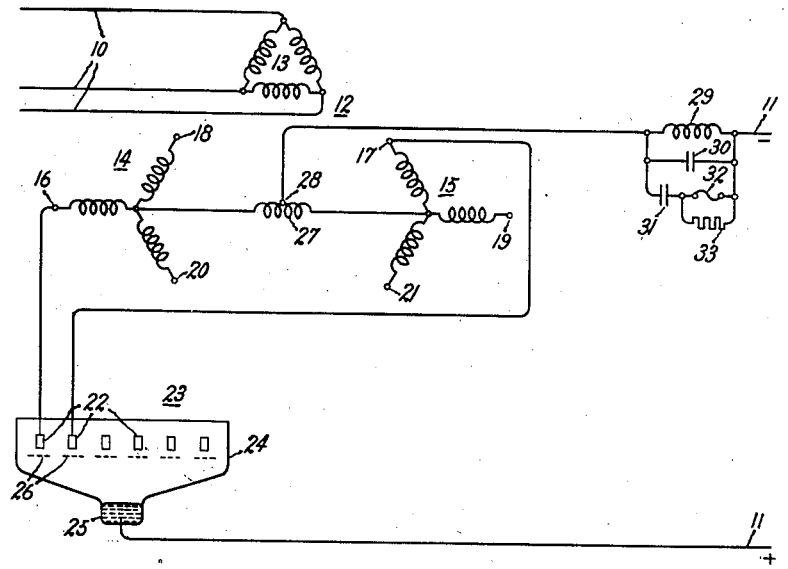
Inventor:
Levin W. Foster,
by Harry C. Dunham
His Attorney.

Patented Feb. 16, 1943

2,311,376

UNITED STATES PATENT OFFICE 2,311,376

PROTECTIVE CIRCUIT

Levin W. Foster, Pittsfield, Mass., assignor to General Electric Company, a corporation of New York Application September 11, 1941, Serial No. 410,403

5 Claims. (Cl. 175—363)

My invention relates to protective systems and more particularly to the protection of harmonic filters of the type commonly employed on the direct current side of electric valve rectifying systems.

In order to prevent the flow of harmonic currents of considerable magnitude on the direct current side of electric valve rectifying apparatus harmonic filters of the type including an inductive and a capacitive element in parallel have been commonly employed. These filters are subjected at intervals to harmonic voltages of greater magnitude than normal and in the past such equipment has been designed with a generous safety factor or has been subject to destruction of the capacitive unit due to the overload. In accordance with my invention I provide a simple and inexpensive arrangement for protecting the capacitive element of a parallel resonant circuit from destruction by means of additional equipment of relatively small electrical rating and low cost.

It is an object of my invention to provide a new and improved protective circuit.

It is another object of my invention to provide a new and improved arrangement for protecting harmonic filters from overload.

In accordance with the illustrated embodiment of my invention, a harmonic filter of the type including a parallel connected inductance and capacitance is connected in the direct current circuit of a double three-phase electric valve rectifier. The capacitance of the filter comprises two capacitor units connected in parallel. Connected in series with one of the capacitor units is a fusible element and a resistor connected in parallel. In many cases the resistance may comprise the strain wire of the fusible element. In the operation of such a device the overload to which the tuned circuit is subjected will melt the fuse link first and often the insertion of the increased resistance of the strain wire will detune the circuit sufficiently to decrease the overload current and prevent destruction of either of the capacitors. In other cases the strain wire may also melt, in which case the effective resistance of the arc is sufficient to detune the parallel circuit and reduce the current through the other capacitive unit. In this way a device of very small electrical rating is effective to protect the capacitive units of the filter.

My invention will be better understood by reference to the following description taken in connection with the accompanying drawing and its scope will be pointed out in the appended claims.

In the drawing the single figure is a schematic representation of one embodiment of my invention.

Referring now to the drawing, I have shown my invention in connection with a simple double three-phase rectifier system interconnecting an alternating current supply circuit 10 and a direct current load circuit 11. A phase multiplying supply transformer 12 including a delta-connected primary winding 13 and electrically displaced Y-connected secondary windings 14 and 15, is provided to double the effective phases of the supply circuit and provide phase terminals 16 to 21, inclusive, for the energization of the anodes 22 of an electric valve means illustrated generally by the numeral 23. The electric valve means may be of any of the types well known in the art and in the particular arrangement illustrated comprises a container 24 within which are mounted in addition to the six anodes 22 a mercury pool type cathode 25, and if desired, control members or grids 26 which are associated with the anodes 22. The particular form of the valve means employed is not important to the present invention and may be of the type in which a single anode and cathode, together with an immersion igniter type of control member, are enclosed in a single container having an ionizable medium therein. The phase terminals 16 and 17 have been shown connected to two of the anodes 22 of the valve means 23. It will be understood that the remaining phase terminals are connected to the remainder of the anodes. Inasmuch as the present invention is equally applicable to valve converting systems whether or not grid control is employed, no circuit for controlling the energization of the control members 26 has been shown. The secondary windings 14 and 15 are interconnected by a phase equalizing impedance element 27 having a midterminal 28 connected to the negative line of the direct current circuit 11. The positive line of the direct current circuit is connected with the cathode 25.

As illustrated in the drawing, the harmonic filter comprises an inductive impedance element 29 in parallel with which are connected capacitors 30 and 31. In series with the capacitor 31 is connected a fusible element 32 and a resistor 33. The resistance 33 may vary in magnitude and to advantage may be incorporated in the strain wire of the fuse device. It is only necessary that sufficient resistance be provided to detune the circuit comprising the capacitors 30 and 31 and the inductive element 29 sufficiently to prevent injury to the capacitors when there is a large increase in the harmonic voltage impressed across the terminals of the filter.

It will be readily understood by those skilled in the art that the filter is tuned to the frequency of the harmonic which it is desired to eliminate and there may be more than one filter in the event that there are several harmonics to be removed. If the filter is tuned to the sixth harmonic, for example, of the frequency of supply circuit 10, which may be for instance 60 cycles, the filter will be a 360-cycle filter. If, due to some disturbance in the alternating current circuit, the harmonic voltage across the filter unit increases, it may cause rupture of the fusible element. If the strain wire is not also melted, a considerable resistance will be inserted in circuit with the capacitor 31 and the filter will be detuned so that the current through the capacitors will be greatly reduced. It may happen that the strain wire is also melted and in such case the resistance of the arc interposed in circuit with the condenser 31 serves to detune the filter and decrease the current through the capacitor.

It is not necessary that the resistance be provided by the strain wire of a fuse and in the broader aspects of my invention it is contemplated that other resistance means may be employed and other circuit interrupters than a fuse may also be employed although a fuse is desirable in those cases where it is adequate because of the small cost involved. The division of the capacitor into parallel branches also reduces the rating of the fuse or other circuit interrupter required to detune the circuit. It will also be readily understood that my invention is not limited to the protection of harmonic filters but may be utilized to protect parallel tuned circuits employed in other types of equipment.

While I have shown and described a particular embodiment of my invention, it will be obvious to those skilled in the art that changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. A harmonic filter for electric translating apparatus including an alternating current circuit, comprising parallel connected inductive and capacitive elements tuned to a frequency of the harmonic of said alternating current circuit, and means responsive to an abnormal current flow in one of said parallel connected elements for increasing the impedance in circuit with one of said parallel connected elements to detune said circuit and thereby to prevent said elements from damage due to excess current.

2. In combination, a tuned circuit comprising an inductive element and at least two capacitive elements connected in parallel therewith, a resistor connected in series with one of said capacitive elements, and circuit controlling means normally short-circuiting said resistance and operable in response to a predetermined current condition in the circuit in which it is connected for inserting said resistance in circuit with said one capacitance to detune said tuned circuit.

3. In combination, a filter comprising parallel connected inductive impedance and capacitive impedance elements, a resistor connected in series with a capacitive element of said filter, and circuit controlling means operable in response to a predetermined current condition of one of said elements for inserting said resistor in circuit with said capacitance element to detune said filter and thereby reduce the harmonic current flowing through said element.

4. In combination, an alternating current supply circuit, a direct current load circuit, electric valve converting apparatus interconnecting said circuits, a filter connected in one line of said direct current load circuit comprising parallel connected inductive and capacitive impedance elements tuned to a harmonic of said alternating current circuit, an impedance connected in series with one of said elements, and a fusible element paralleling said impedance and normally short-circuiting the same, said element being designed to rupture upon a predetermined current condition and insert said impedance in circuit with said capacitive element to detune said filter.

5. A filter tuned to a predetermined frequency comprising an inductive element and a plurality of capacitive elements connected in parallel therewith, and means connected in series with one of said capacitive elements and operable in response to an abnormal current therethrough for changing the impedance in circuit with said capacitive element to detune said filter and thereby protect the elements of said filter from damage due to overcurrent.

LEVIN W. FOSTER.

CERTIFICATE OF CORRECTION.

Patent No. 2,311,376.              February 16, 1943.

LEVIN W. FOSTER.

It is hereby certified that error appears in the printed specification of the above numbered patent requiring correction as follows: Page 2, first column, line 53, for "a" read --the--; and second column, line 1, for "the" read --a--; and that the said Letters Patent should be read with this correction therein that the same may conform to the record of the case in the Patent Office.

Signed and sealed this 6th day of April, A. D. 1943.

Henry Van Arsdale,
Acting Commissioner of Patents.

(Seal)